United States Patent [19]

Adachi et al.

[11] 4,222,727

[45] Sep. 16, 1980

[54] APPARATUS FOR PRODUCING GRANULES FROM FINE POWDER

[75] Inventors: Ryoichi Adachi, Ichihara; Toshihito Hayashi, Ichihata, both of Japan

[73] Assignee: Phillips Petroleum Company, Bartlesville, Okla.

[21] Appl. No.: 970,077

[22] Filed: Dec. 15, 1978

[30] Foreign Application Priority Data

May 11, 1978 [JP] Japan .................................. 53-062190

[51] Int. Cl.² .............................................. B29G 7/00
[52] U.S. Cl. ..................................... 425/222; 264/117
[58] Field of Search ......................... 425/222; 264/117

[56] References Cited

U.S. PATENT DOCUMENTS

| 2,550,802 | 5/1951 | Gholson ........................... 425/222 |
| 3,674,437 | 7/1972 | Austin et al. ..................... 23/314 |

Primary Examiner—Donald J. Arnold
Assistant Examiner—James R. Hall

[57] ABSTRACT

An apparatus for the preparation of granules from fine powder in which a shaft is mounted for rotation about the longitudinal axis of a cylindrical housing, a screw conveyor blade is mounted on the shaft to convey powder entering the housing through an inlet to a plurality of stirring pins which are arranged in a double helix along the shaft in a granulation zone of the housing, a disc being attached to the shaft to partially close the cross-section of the housing in a mid-portion of the granulation zone.

10 Claims, 2 Drawing Figures

APPARATUS FOR PRODUCING GRANULES FROM FINE POWDER

This invention relates to an apparatus for the preparation of granules from fine powder. The invention is particularly, although not exclusively, concerned with the production of granules from carbon black.

The carbon black which is produced in a reaction furnace consists of particles having diameters of the order of microns and has a bulk specific gravity which is in the region of 50 kilograms per cubic meter. As a result of this small particle size and low specific gravity, the carbon black tends to develop the so-called dusting phenomenon, which results in environmental pollution if the carbon black is not properly handled. As a result, various problems of transportation, mixing, delivery, storage, packaging, kneading, etc. are created.

Accordingly, it is desirable to granulate the carbon black for the purpose of easing the aforementioned problems thereby to prevent any avoidable environmental pollution.

Prior art apparatus for granulation of carbon black has utilized a plurality of stirring pins, mounted for rotation with a shaft within a housing, with carbon black being fed to the granulation zone so formed to be mixed with a binder and stirred by the stirring pins to form granules. The mechanism by which the granules are formed is not entirely understood, however, it is believed that the agitation and rotary movement of the carbon granules is produced by a shearing force created by each individual stirring pin in combination with the extrusion force produced by the means for conveying the carbon black to the granulation zone. The combination of these forces results in carbon particles adhering to the water film on the surface of other particles to form small granules which then further adhere to the water film on other granules to increase the size of the granules. In this prior art apparatus wear of the stirring pins occurs at such a rate that periodic regrinding of the pins is required every 2000 or 2,500 hours of operation with the consequent loss of production. Additionally it is difficult in the prior art apparatus to produce granules of a particular desired hardness in a consistent manner. Also, during the start-up of the apparatus much time and effort is required in achieving stabilization of the granulation process with the product produced during this period frequently falling outside of the required specifications.

It is an object of the present invention to provide an apparatus for producing granules from fine powder, such as carbon black, in which the aforementioned problems of prior art apparatus are reduced or eliminated. According to the invention, there is provided an apparatus for the preparation of granules from fine powder comprising a cylindrical housing including a cylindrical wall portion defining a longitudinal axis, a granulation chamber symmetrically disposed about said axis, a longitudinally spaced entrance and exit disposed at opposite ends of said housing respectively and at least one inlet to said chamber for supply of a binder thereto; a shaft extending longitudinally through said granulation chamber coaxially with and mounted for rotation about said axis; a plurality of stirring pins fixedly attached to said shaft to project radially therefrom in spaced apart relationship along said axis substantially throughout the longitudinal extent of the granulation chamber; and an obstruction means extending normal to said axis to close a portion of a cross-section, normal to said axis, of said granulation chamber and to define with the cylindrical wall portion an opening adjacent said cylindrical wall portion.

The invention will now be described, by way of example, with reference to the accompanying drawings, in which.

Figure 1:
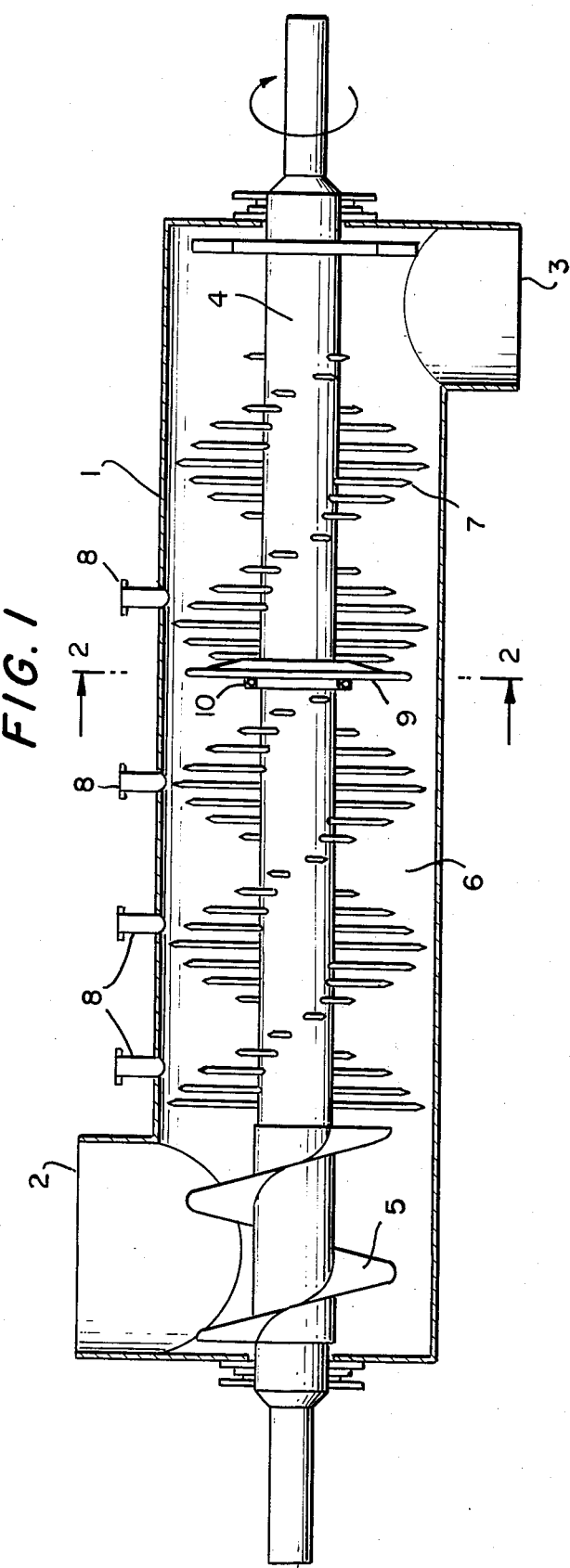
FIG. 1 is a diagrammatic sectional elevation.
Figure 2:
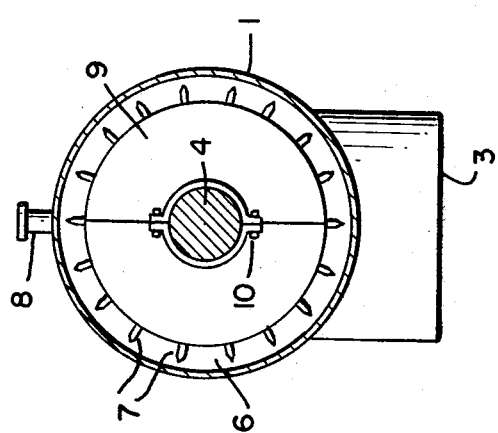
FIG. 2 is a diagrammatic cross-section line 2—2 of FIG. 1.

With reference to the drawings, an elongate cylindrical housing 1 is provided with an entrance 2 at one end and with an exit 3 at the other end. A shaft 4 extends longitudinally through the housing coaxially with the longitudinal axis of the housing for rotation about that axis. Adjacent the entrance 2, a helical screw conveyor blade 5 is attached to the shaft 4 to receive carbon black entering the housing from the entrance and, upon rotation of the shaft, to convey that carbon black to an elongate granulation zone or chamber 6 defined by a cylindrical wall portion of the housing 1. In the granulation zone a plurality of stirring pins 7 are attached to the shaft 4 from which they project in a direction normal to the axis of the shaft to form a double helix of stirring pins extending along the shaft through the granulation zone 6.

Disposed along the length of the granulation zone 6 and extending through the cylindrical wall portion of the housing 1 are four inlet pipes adapted for the supply of a binder, such as water, to the granulation zone 6.

As will be apparent to any man skilled in the art, the shaft will be appropriately supported in bearings and the apparatus will be associated with drive means suitable for rotating the shaft at a desired speed. As the construction of these elements will be well known in the art, they will not be described herein and are not illustrated in the drawings.

The outer end of each of the stirring pins 7 is formed into a cone to produce a sharp point. Each stirring pin has a diameter of approximately 19 millimeters.

The clearance between the ends of the stirring pins 7 and the inner surface of the cylindrical wall portion of the housing in the granulation zone is between about 5 and about 15 millimeters. In operation the shaft is rotated at between 300 and 500 rpm.

The granulation zone 6 is divided longitudinally by a disc 9 having a central opening through which the shaft 4 extends, the disc being attached to the shaft by clamping means 10. Although the disc is shown to have an annular tapered surface on one side whereby the thickness of the disc increases radially toward the axis of the shaft 4, it will be appreciated that a flat disc could be employed and that other cross-sections are possible providing the necessary requirements for rigidity and strength are met.

The radial clearance between the outer circumference of the disc and the adjacent inner surface of the cylindrical wall portion is between about 18 and about 80 millimeters and, preferably, between about 20 and about 25 millimeters. These ranges are not regarded as limiting and may vary in accordance with the type of carbon black used and the conditions involved in the granulation. The disc is located approximately centrally of the longitudinal extension of the granulation zone 6.

In the operation of the apparatus, carbon black which has been captured by a capturing device, such as a bag filter, following production in a reaction furnace is conveyed, for example pneumatically, through entrance 2 to be received by the screw conveyor blade 5 for conveyance thereby to the granulation zone 6. In the granulation zone 6 water supplied through the inlet pipes 8 is added to the carbon black and the resulting mixture is stirred by the stirring pins 7 to produce granules as a result of the mutual binding force of the mixture. The helical disposition of the stirring pins 7 serves to convey the mixture toward the exit 3 as the granules are being produced with the granules exiting through exit 3.

By comparison with prior art granulation apparatus the provision of the disc in the granulation zone of the present invention provides substantially improved performance. This is believed due to the fact that carbon black that has been insufficiently granulated is prevented by the disc from flowing to the exit 3. This is as a result of the low centrifugal force of small granules by comparison with the larger better formed granules, as a consequence of which the better formed granules occupy the annular space adjacent the cylindrical wall of the housing and can pass through the radial clearance between the disc and the housing toward the exit 3 while the improperly formed smaller granules are prevented from movement along the granulation zone by the disc 9 until their mass increases sufficiently for them to compete for the space adjacent the cylindrical wall of the housing.

As a result of the inhibited longitudinal conveyance of the smaller less well formed granules, the product of the apparatus of the present invention has improved uniformity in relation to prior art apparatus.

Tests of apparatus according to the present invention have confirmed that the provision of a disc in the granulation zone achieves the following effects:

(I) The time between the regrinding maintenance of the stirring pins is in the range between 4,000 and 5,000 hours (i.e. about twice that of the prior art apparatus).

(II) The granule sixe uniformity and bulk specific gravity of the various products of granulation carbon black have been improved as shown in the following table (granulation was carried out under the same conditions in the various examples.)

(III) Improved granule size distribution and smaller standard deviation of the granules, with a consequence that the temperature of the products at the exit of the dryer has been stabilized, the frequency of the off-specification products decreased, the danger of product ignition decreased and the undried portion is smaller.

(IV) As the bulk specific gravity has been made higher, the volume has become smaller with resulting economies in transport and storage. At the same time, the pulverization of the granules has been reduced.

(V) The time required for the stabilization of granulation has been reduced during start-up of a plant. Moreover, the drying temperature has been stabilized and the amount of off-specification product at the start has been reduced.

(VI) The internal diameter of the cylindrical wall portion of the housing 1 is approximately 0.5 meters.

We claim:

1. An apparatus for the preparation of granules from fine powder comprising:
  a cylindrical housing including a cylindrical wall portion defining a longitudinal axis, a cylindrical granulation chamber symmetrically disposed about said axis, a longitudinally spaced entrance and exit disposed at opposite ends of said housing respectively and at least one inlet to said chamber for supply of a binder thereto;
  a shaft extending longitudinally through said granulation chamber coaxially with and mounted for rotation about said axis;
  a plurality of stirring pins fixedly attached to said shaft to project generally radially therefrom in spaced apart relationship along said axis substantially throughout the longitudinal extent of the granulation chamber; and
  obstruction means mounted on said shaft and extending generally normal to said axis to close a generally circular portion of a transverse cross-section of said granulation chamber and to define with the cylindrical wall portion an annular opening adjacent said cylindrical wall portion, whereby said annular opening inhibits longitudinal conveyance of smaller less well formed granules therepast toward said exit.

2. Apparatus according to claim 1, wherein said obstruction means is a disc defining with said cylindrical wall portion an annular opening adjacent said cylindrical wall portion.

3. Apparatus according to claim 2, wherein said disc is disposed approximately centrally of the longitudinal extent of said granulation chamber.

4. Apparatus according to claim 3, wherein said disc is fixedly mounted to said shaft for rotation therewith.

5. Apparatus according to claim 4, wherein said plurality of stirring pins are symmetrically disposed in at least one helix about said shaft.

6. Apparatus according to claim 5, wherein said plurality of stirring pins are arranged in a double helix.

| Carbon Black Product Type | | Grain Size Distribution, Percent (mesh on) | | | | Mean Granule diameter | Standard deviation | Bulk specific gravity |
|---|---|---|---|---|---|---|---|---|
| | | #10 | #18 | #35 | #60 | mm | | Kg/L |
| N220 | Prior Art Example | 9 | 28 | 66 | 87 | 0.61 | 2.55 | 0.342 |
| | Present Invention | 7 | 26 | 67 | 91 | 0.60 | 2.30 | 0.352 |
| N285 | Prior Art Example | 6.2 | 23.5 | 52 | 84 | 0.45 | 2.54 | 0.320 |
| | Present Invention | 4.7 | 21.2 | 50.2 | 89 | 0.45 | 2.37 | 0.332 |
| N330 | Prior Art Example | 4.2 | 22.3 | 63 | 93 | 0.56 | 2.05 | 0.356 |
| | Present Invention | 2.2 | 20.3 | 63.5 | 96 | 0.56 | 1.67 | 0.379 |

7. Apparatus according to claim 6, wherein a screw conveyor blade is fixedly attached to said shaft adjacent said entrance to convey powder from said entrance to said stirring pins in said granulation chamber.

8. Apparatus according to claim 7, wherein said stirring pins project a greater radial distance from said axis than does the pheriphery of said disc.

9. Apparatus according to claim 8, wherein the radial clearance between the ends of the stirring pins and said cylindrical wall portion is from about 5 millimeters to about 15 millimeters and the radial clearance between said disc and said cylindrical wall portion is from about 18 millimeters to about 80 millimeters.

10. Apparatus according to claim 9, wherein the radial clearance between said disc and a said cylindrical wall portion is from about 20 millimeters to about 25 millimeters.

* * * * *